May 18, 1937.    W. L. MORRISON    2,080,433
AUTOMOBILE
Filed Oct. 4, 1933    3 Sheets-Sheet 1

Inventor:
Willard L. Morrison,
By Parker & Carter
Attys.

May 18, 1937. W. L. MORRISON 2,080,433
AUTOMOBILE
Filed Oct. 4, 1933 3 Sheets-Sheet 2
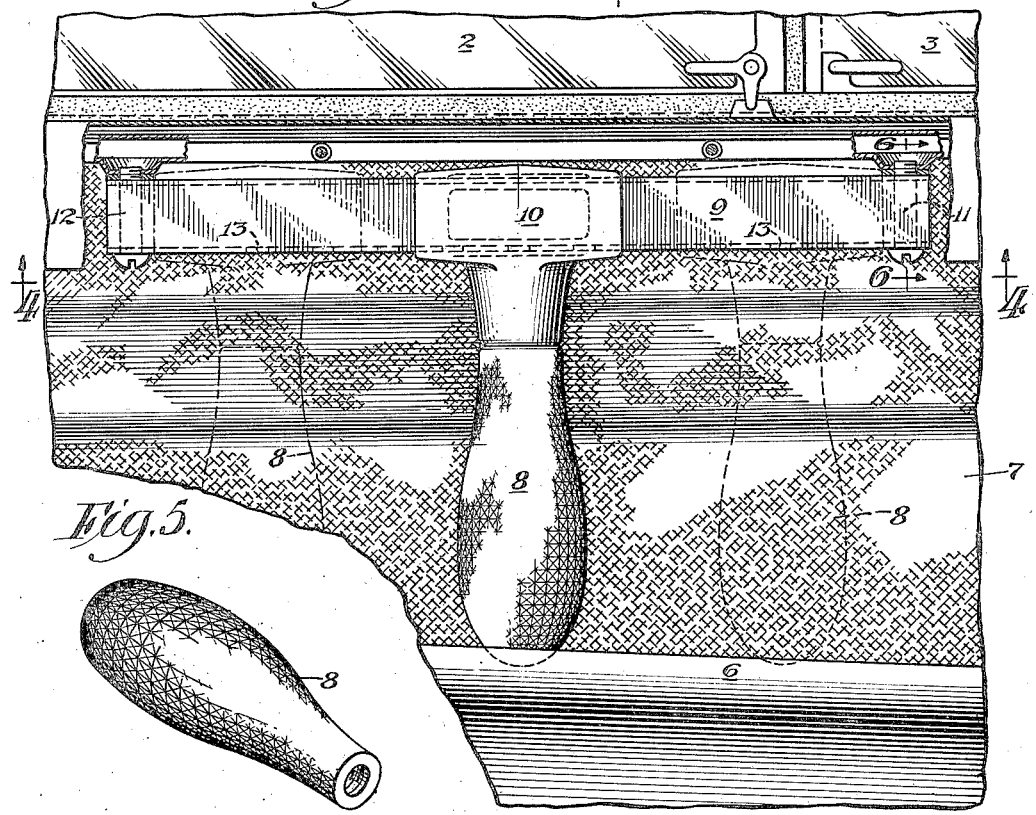
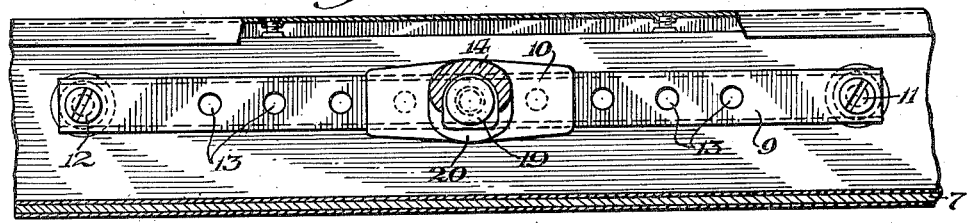
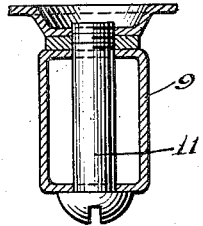
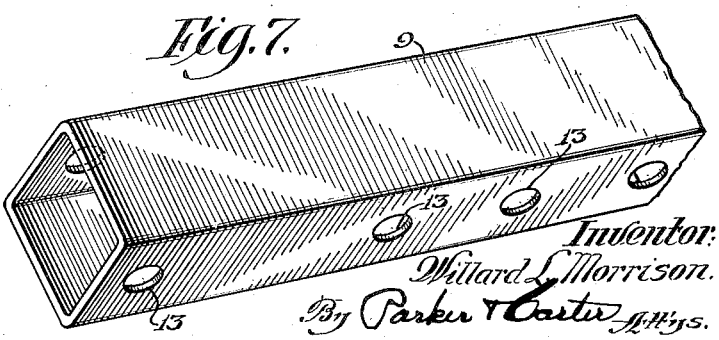
Inventor:
Willard L. Morrison.
By Parker & Carter Attys.

May 18, 1937. W. L. MORRISON 2,080,433
AUTOMOBILE
Filed Oct. 4, 1933 3 Sheets-Sheet 3
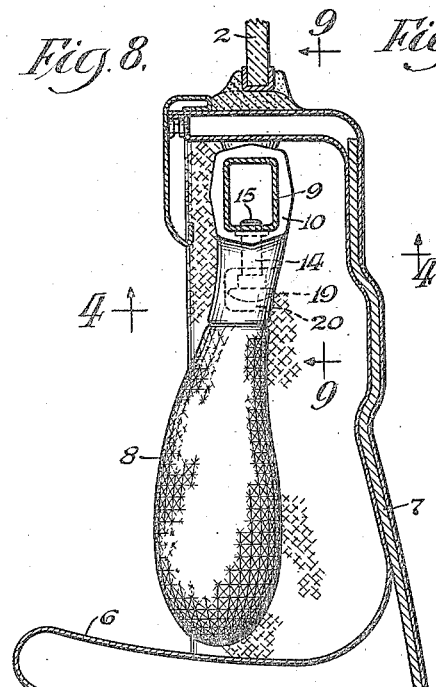
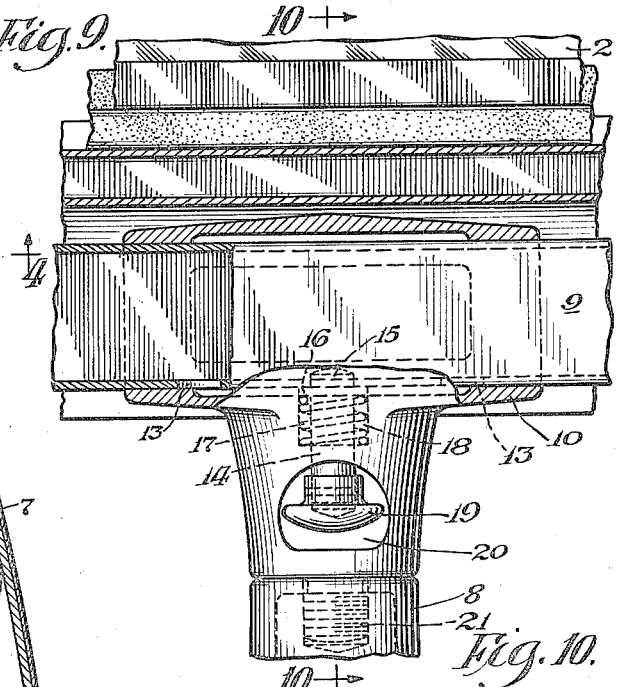
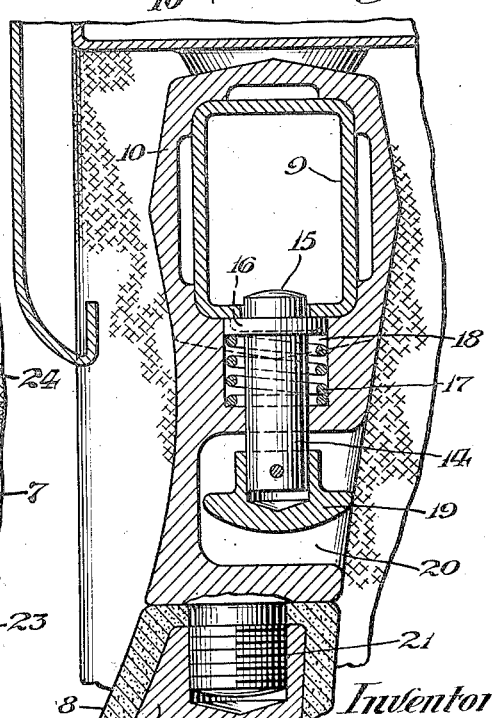
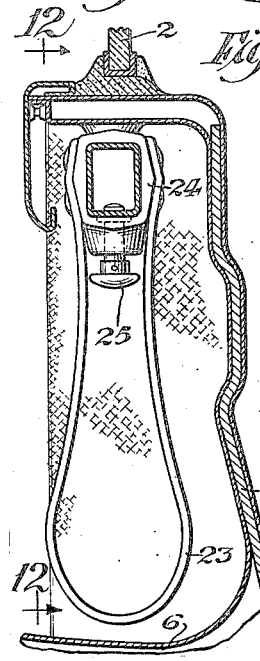
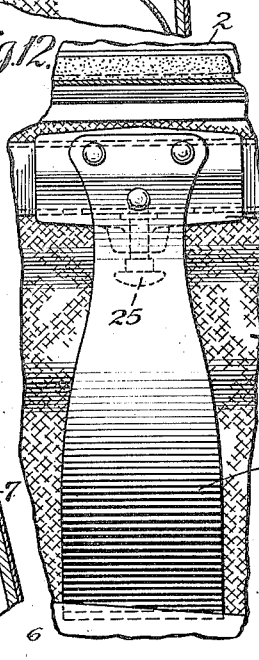
Inventor:
Willard L. Morrison,
By Parker & Carter Attys.

Patented May 18, 1937

2,080,433

UNITED STATES PATENT OFFICE 2,080,433

AUTOMOBILE

Willard L. Morrison, Lake Forest, Ill.

Application October 4, 1933, Serial No. 692,083

7 Claims. (Cl. 296—44)

This invention relates to improvements in automobiles and has for its object to provide a new and improved device of this description. The invention has as a further object to provide an automobile having on the interior thereof an arm rest and a steadying device in proximity to said arm rest which may be grasped when the arm of an occupant of the automobile is on the arm rest, so as to hold the occupant steady. The invention has as a further object to provide a device of this nature which is easily accessible to be in proper position for grasping. The invention has other objects which are more particularly pointed out in the accompanying description.

Referring now to the drawings, Fig. 1 is a view of an automobile embodying one form of the invention;

Fig. 3 is an enlarged view of the hand hold and a portion of the arm rest;

Fig. 4 is a sectional view taken on line 4—4 of Fig. 3;

Fig. 5 is a perspective view of one form of part grasped by the hand;

Fig. 6 is a sectional view taken on line 6—6 of Fig. 3;

Fig. 7 is a perspective view of the support on which the hand hold is adjustably mounted;

Fig. 8 is a sectional view taken on line 8—8 of Fig. 3;

Fig. 9 is an enlarged sectional view taken on line 9—9 of Fig. 8;

Fig. 10 is a sectional view taken on line 10—10 of Fig. 9;

Fig. 11 is a view showing a modified construction of the hand hold;

Fig. 12 is a view taken on line 12—12 of Fig. 11.

In the construction shown there is illustrated an automobile 1 provided with windows 2, 3, 4, and 5. On the interior of the body of the automobile is an arm rest 6. There may be arm rests on both sides of the automobile and at the front and the rear end. I have shown only one for purposes of illustration.

Figure 1:
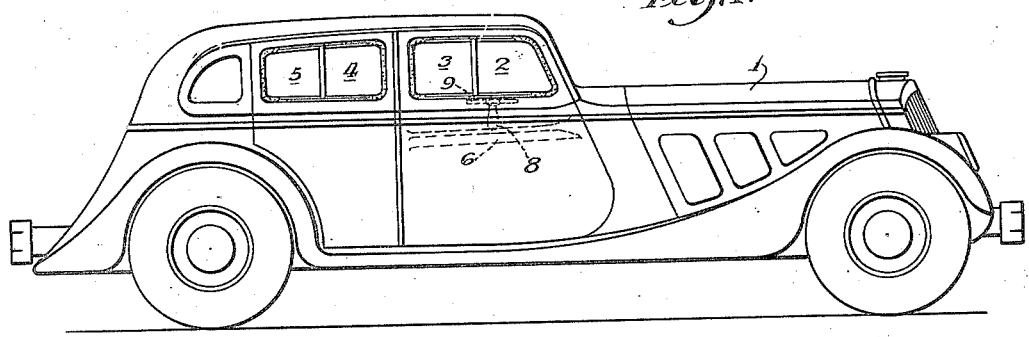
Figure 2:
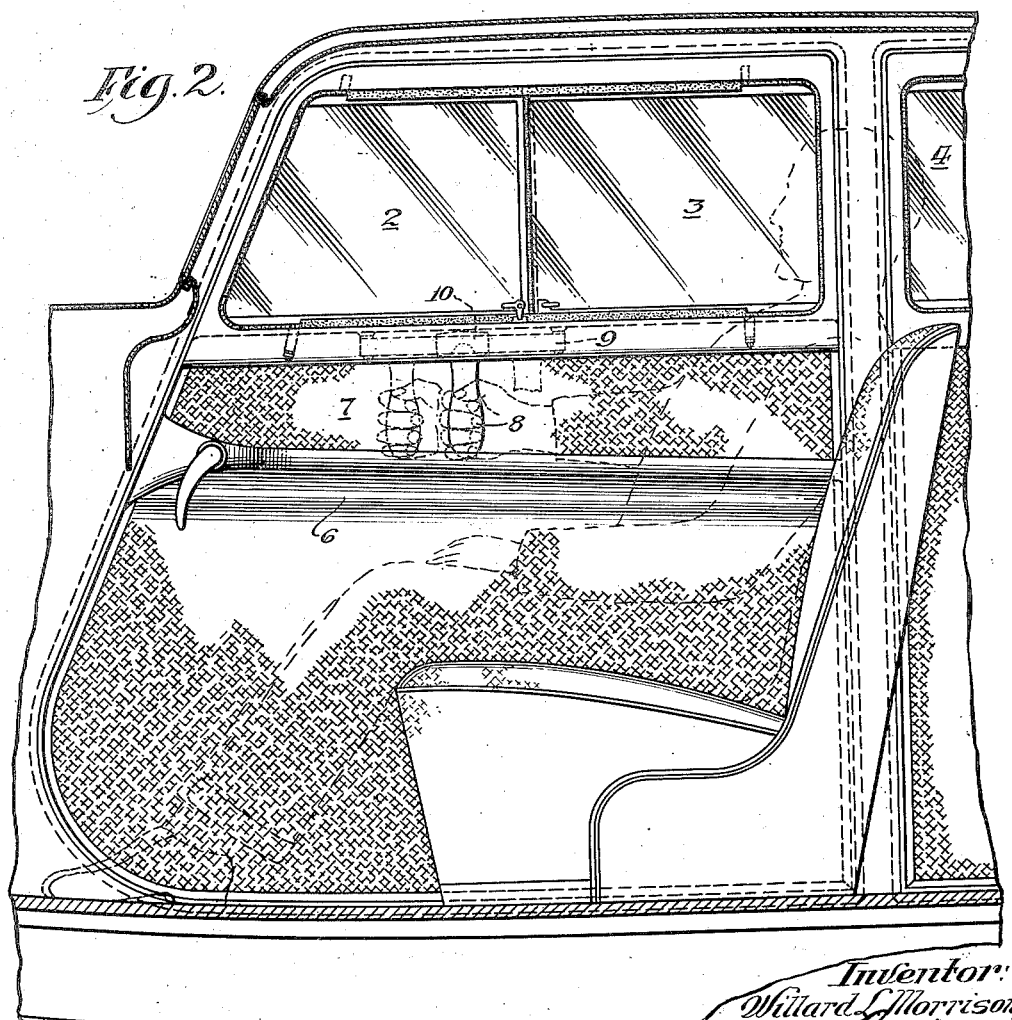
Fig. 2 is a view of the interior of the front of the body of the automobile showing the device in position.

This arm rest 6 projects outwardly from the wall 7, which in this instance is the outer wall of one of the doors, and is locked below the windows. This provides a space below the window and between the window and the arm rest for the arm of the occupant. Above the arm rest is a hand hold 8 in position to be grasped by the hand when the occupant's arm is on the arm rest, as shown in Fig. 2. This hand hold is preferably adjustable so that it may be placed in any position the occupant desires to have it to suit his convenience. One construction for this purpose is herein shown.

In this construction there is located above the arm rest 6 and below the windows a guide member 9. The hand hold 8 is provided with a member 10 which engages the guide 9 and which may be slid therealong and held in any desired position. This guide may be formed in any convenient manner. As herein shown it consists of a hollow member fastened in position at its ends by the fastening devices 11 and 12. These fastening devices are shown as screws which pass through the member 9 and enter threaded openings in some suitable fixed part of the automobile below the window. The member 10 of the hand hold 8 which engages it is preferably a part having an opening therein of sufficient size to receive the guide 9. The guide 9 is provided with a series of holes 13 in one end thereof. The hand hold is provided with a spring pressed pin 14 having an end 15 adapted to be inserted in one of these holes. There is a collar 16 which limits the movement of the pin and a spring 17 surrounding the pin and locked in a recess 18 in the member 10. The spring engages the bottom of the recess and the collar 16. There is a hand piece 19 on the pin 14 which is received in a recess 20 in the member 10.

When it is desired to adjust the position of the hand hold, the hand piece 19 is grasped and the pin pulled to release it from the opening 13 in which it at that time is received. The hand hold may then be pushed along to any desired position on the guide. The pin may then be released and its end will enter one of the holes so as to hold the hand hold in the adjusted position. The member 10 is preferably provided with a threaded end 21 and the part 8 grasped by the hand may be made of non-metallic material covering a rigid piece 22 and having a threaded opening in it so that it may be attached to the part 21.

Figures 11 and 12 show a modified construction wherein the part 23 grasped by the hand may consist of a strap, which in turn is fastened to a sliding member 24 on the guide 9. This sliding member has a pin 25 and associated parts similar to the pin 14, by means of which it may be adjusted to various positions.

It will be seen that by this construction there is provided an arm rest for the arm of the occupant of the automobile, and at the same time a hand hold which the occupant may grasp, the arm rest giving a proper rest for the arm, and the hand hold giving a means for holding the occupant steady, that is for preventing the occupant from being moved by the swaying of the automobile, such as rounding corners or passing along curves and when the direction of the automobile is changed. This adds greatly to the convenience of the occupant in riding, as it tends to anchor such occupant in position, and this is done in a very simple and effective manner.

It will be noted that the hand hold is shaped to fit the hand of the occupant so that it will not slip out of his hand.

I claim:

1. An automobile comprising a body, an arm rest on the interior of said body, a guiding part above said arm rest, a hand hold projecting below said guiding part and being adjustably connected therewith.

2. An automobile comprising a body, an arm rest on the interior of said body, a guiding part above said arm rest, a hand hold projecting below said guiding part and being adjustably connected therewith, and means for fixing said handhold to said guiding device.

3. An automobile comprising a body, an arm rest on the interior of said body, a guiding part above said arm rest, a hand hold projecting below said guiding part and being adjustably connected therewith, said guiding device provided with spaced openings, a movable member connected with the hand hold and adapted to be inserted into any one of said openings to lock the hand hold to the guiding device.

4. An automobile comprising a body, an arm rest on the interior of said body, a guiding device below said window and above said arm rest, an adjustable member on said guiding device, a spring pressed pin connected with said member, the guiding device having a series of spaced openings in which the end of the pin is received, the adjustable member being recessed, the end of the pin projecting into said recess so that it can be reached by the occupant and moved to release the hand hold and adjust it.

5. An automobile comprising a body, an arm rest on the interior of said body and a hand hold above said arm rest to be grasped by the hand of the occupant when the arm of the occupant is on the arm rest, the automobile body being provided with a recess into which the hand hold and arm rest are received so as to be out of the way.

6. An automobile comprising a body, an arm rest on the interior of said body and a hand hold above said arm rest to be grasped by the hand of the occupant when the arm of the occupant is on the arm rest, the automobile body being provided with a recess into which the hand hold and arm rest are received so as to be out of the way, said hand hold adjustably supported in position.

7. An automobile comprising a body, an arm rest on the interior of said body and a hand hold above said arm rest to be grasped by the hand of the occupant when the arm of the occupant is on the arm rest, the automobile body being provided with a recess into which the hand hold and arm rest are received so as to be out of the way, said hand hold shaped to fit the hand of the occupant.

WILLARD L. MORRISON.